A. W. TUCKER.
Sulky Plow.
No. 202,304.  Patented April 9, 1878.
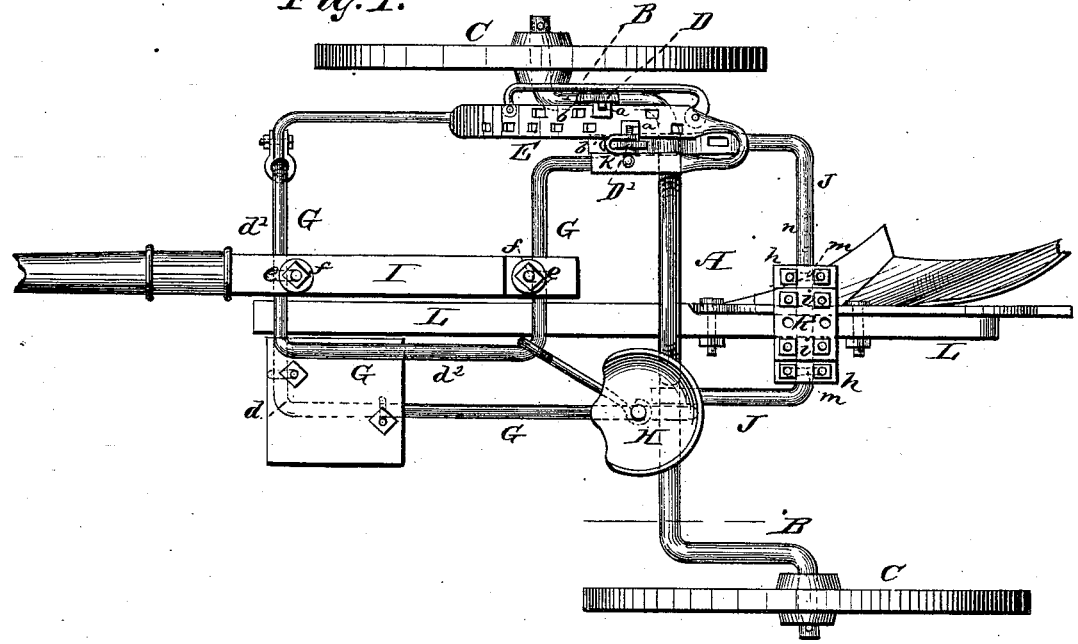
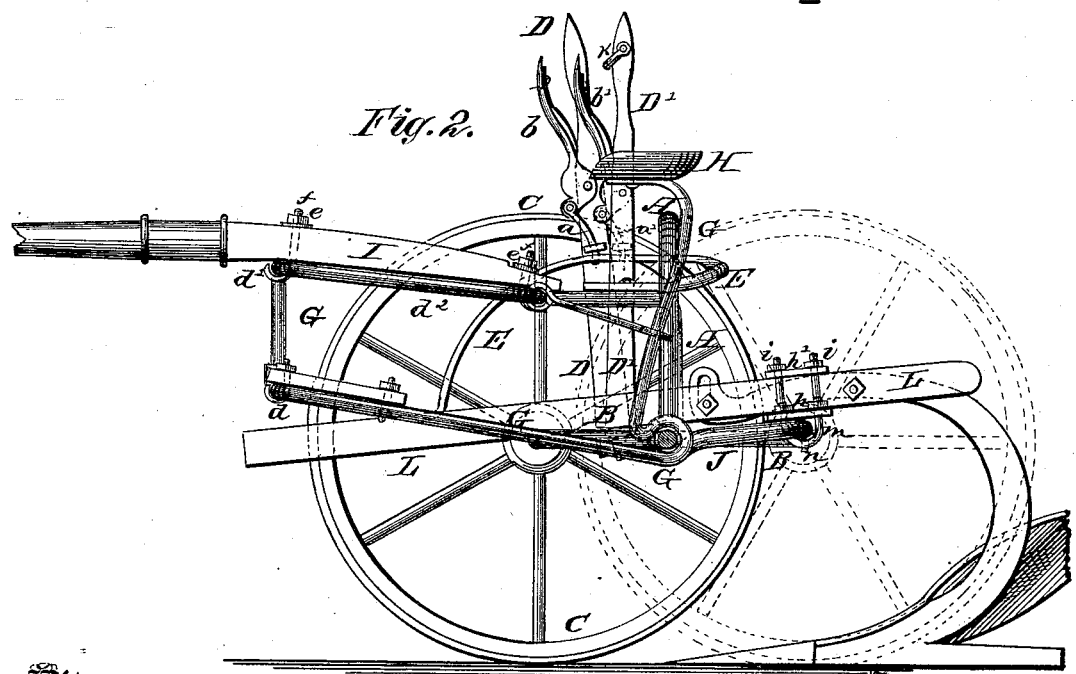

UNITED STATES PATENT OFFICE.

ARGYLE W. TUCKER, OF WAXAHACHIE, ASSIGNOR TO ALFORD & SORLEY, OF DALLAS, TEXAS.

IMPROVEMENT IN SULKY-PLOWS.

Specification forming part of Letters Patent No. 202,304, dated April 9, 1878; application filed July 28, 1877.

*To all whom it may concern:*

Be it known that I, ARGYLE W. TUCKER, of Waxahachie, in the county of Ellis and State of Texas, have invented certain new and useful Improvements in Sulky Plow and Cultivator; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and arrangement of a sulky plow and cultivator, as will be hereinafter more fully set forth.

In the annexed drawings, Figure 1 is a plan view. Fig. 2 is a side elevation, partly in section.

A represents the arched axle, provided at its ends with cranks B B, set in opposite directions, and carrying the driving-wheels C C.

By this arrangement of the cranks the plow and wagon are easily leveled to any inequality of the land with one lever without changing the depth of the plow. The wheel that runs in the furrow is forward of the other, and allows the point of the plows to come forward to the center of the wheels, so that the plows need not be pulled out of the ground to turn around. It also catches the plow far enough back to carry the entire weight of the plow.

In one of the cranks B is fastened a lever, D, by means of which the axle is operated, said lever being provided with a locking-pin, $a$, which takes into any one of a series of holes in a segment, E, for holding the axle in the desired position, and said locking-pin operated by means of a spring-handle or lever, $b$, pivoted to the lever D. The frame of the sulky is formed of a single round rod, G, one end of which forms the support for the driver's seat H, and is turned around one of the cranks B. From this crank the rod or frame G extends forward for a suitable distance, is bent at right angles, as seen at $d$, till it comes to a point in front of and opposite the other crank, when it turns upward, and then a part, $d^1$, runs above and parallel with the part $d$, thence backward nearly to the arched axle, when a part, $d^2$, runs in front of the axle, thence rearward and downward to the other crank of the axle, both cranks turning in the frame. The segment E is firmly fastened to the frame. I is the tongue, fastened by hook-bolts $ff$ and nuts $e\ e$ to the top of the parts $d^1$ and $d^2$ of the frame, and can be adjusted laterally thereon, as may be required for the proper working of the plow and cultivator. On the two cranks of the axle is pivoted a rearwardly-extending bail, J, to which the plow-beam is connected, and one end of this bail extends forward in front of the axle, and to this projecting end is fastened a lever, D', by means of which the plow is raised and lowered, as required. This lever is also provided with a locking-pin, $a'$, and spring-handle $b'$, for locking the lever in the perforated segment E. The two levers D D' are arranged on opposite sides of said segment, and the segment has two series of holes for the two locking-pins to enter into. L represents the plow-beam, which is fastened between two plates, $h\ h'$, by means of bolts $i\ i$. The bottom plate $h$ is longer than the top plate $h'$, and said bottom plate is fastened on top of the bail J by means of clips $m\ m$, and all lateral motion of the plow is prevented by one of the clips $m$ fitting between projecting pins or lugs $n\ n$ on the bail. There are several of such pins or lugs, so that the plow can be adjusted laterally, as required, and then held in position. At the top of the plow-lever D' is pivoted a loop, $k$, which may be dropped over the handle $b'$, holding the locking-pin $a'$ out of the segment E, and allowing the lever to go loose in case of rough ground, to prevent the wheel from raising the plow.

If it is desired to work two plows, a piece is put on the plow-beam the width the plows are wanted apart, and bolt on with the same bolts.

Having thus fully described my invention, what I claim as new, and desire to secure by Letters Patent, is—

1. The reversible bail or clevis J, pivoted on the ends of the axle A, adapted for the reception of plow-beams or cultivator-beams, and operated by means of the adjustable lever D', locking-pin $a'$, spring-handle $b'$, and perforated segment E, substantially as and for the purposes herein set forth.

2. In a sulky plow and cultivator, the frame G, constructed of a single rod, bent substantially in the manner shown and described, and forming the seat-supporting arm, as well as the parallel parts $d^1\ d^2$, to which the adjustable tongue I is fastened, substantially as herein set forth.

3. The combination of the reversible clevis J with its operating-lever D′, the plow-beam L, clamp $h\ h'$, and cuffs or clips $m\ m$, with the pins or lugs $n$ on the clevis, substantially as and for the purposes herein set forth.

4. The bent or curved axle, provided with a rigid crank or arm at each end, projecting in opposite directions, in combination with a lock-lever, whereby one wheel is raised and the other lowered by the same action of the lever, substantially as described.

In testimony that I claim the foregoing as my own I affix my signature in presence of two witnesses.

ARGYLE W. TUCKER.

Witnesses:
I. H. HUSBAND,
N. P. NEAL.